United States Patent
Stoick

(10) Patent No.: US 7,827,664 B1
(45) Date of Patent: Nov. 9, 2010

(54) APPARATUS FOR AUTOMATICALLY REMOVING A CONNECTOR CLIP

(75) Inventor: Michael A. Stoick, Armada, MI (US)

(73) Assignee: Express Gage, Inc., Warren, MI (US)

( * ) Notice: Subject to any disclaimer, the term of this patent is extended or adjusted under 35 U.S.C. 154(b) by 809 days.

(21) Appl. No.: 11/203,867

(22) Filed: Aug. 15, 2005

Related U.S. Application Data

(60) Provisional application No. 60/601,870, filed on Aug. 16, 2004.

(51) Int. Cl.
*B23P 19/04* (2006.01)
(52) U.S. Cl. .......................... 29/252; 29/281.1; 29/255
(58) Field of Classification Search .................. 29/252, 29/255, 257, 244, 281.1, 251, 239
See application file for complete search history.

(56) References Cited

U.S. PATENT DOCUMENTS

| | | | | |
|---|---|---|---|---|
| 4,544,134 A | * | 10/1985 | Mitchell | 254/93 R |
| 4,763,394 A | * | 8/1988 | Decato et al. | 29/252 |
| 4,989,310 A | * | 2/1991 | Choat | 29/252 |
| 5,860,203 A | * | 1/1999 | Gehr, Jr. | 29/252 |
| 6,131,261 A | * | 10/2000 | Michlin | 29/251 |
| 6,823,573 B2 | * | 11/2004 | Morrison et al. | 29/237 |
| 7,032,897 B2 | * | 4/2006 | Hausler, III | 269/32 |
| 7,174,614 B2 | * | 2/2007 | Martz et al. | 29/257 |
| 2007/0169328 A1 | * | 7/2007 | Marcial | 29/252 |

* cited by examiner

*Primary Examiner*—Lee D Wilson
(74) *Attorney, Agent, or Firm*—Young, Basile, Hanlon, & MacFarlane, P.C.

(57) ABSTRACT

An apparatus for automatically and simultaneously removing connector clips of a workpiece from a gauge. The present invention includes at least one gauging fixture having at least one aperture extending therethrough in a predetermined position. The at least one aperture is adaptable to receive a connector clip connected to the workpiece wherein the connector clip is engageable with the aperture between a non-engaging position, wherein the connector clip does not engage the aperture, and an engaging position, wherein the connector clip engages the aperture for securing the workpiece against the gauging fixture to gauge the position of the connector clip. At least one linear actuator is connected to the gauging fixture adjacent the aperture to move between a retracted position, wherein the connector clip remains engaged with the gauging fixture, and an extended position, wherein the linear actuator disengages the connector clip from the gauging fixture.

3 Claims, 3 Drawing Sheets

APPARATUS FOR AUTOMATICALLY REMOVING A CONNECTOR CLIP

The following patent application claims priority of provisional patent application Ser. No. 60/601,870 filed Aug. 16, 2004.

FIELD OF THE INVENTION

The present invention relates to gauging fixtures, and more particularly, an apparatus for automatically and simultaneously removing connector clips on a workpiece from a gauging fixture.

BACKGROUND OF THE INVENTION

Automobile parts are commonly assembled with the aid of one-way connector clips. Such connector clips are typically connected to an inside portion of an automobile part or workpiece and inserted through an aperture provided in a wall of an automobile body or a connecting portion. These connector clips typically work in a fashion whereby the connector clip flexes inwardly while being inserted through an aperture and then expands outwardly once the connector clip extends through the aperture such that the connector clip is prevented from being pulled back through the aperture. Thus, the connector clips provide for easy assembly of an automobile part to an automobile body while ensuring that the automobile part is not easily disconnected from the automobile body.

Larger automobile parts, such as sheet metal parts, i.e., body panels, typically utilize a plurality of connector clips. The position of the connector clips relative to the sheet metal part is critical to the assembly of the sheet metal part to the automobile body since the sheet metal part will not properly assemble to the automobile body if all of the connector clips do not properly attach to the automobile body. Therefore, the position of the connector clips is continuously monitored and gauged during the assembly of the connector clips to the sheet metal part. To ensure proper positioning of the connector clips relative to the sheet metal part, gauges have been developed to ensure that the connector clips are properly positioned. Such gauges include gauging fixtures which each provide an aperture for receiving an individual connector clip. The position of the apertures on the gauging fixtures of the gauge replicates the assembly of the sheet metal part to the automobile body. If all of the connector clips fit into the apertures of the gauging fixtures, then the connector clips are considered to be properly positioned on the sheet metal part.

However, once the connector clips are inserted through the apertures in the gauging fixtures, it is difficult to remove the connector clips from the gauging fixtures without damaging the connector clips and the sheet metal part. Thus, it is known to design a gauging fixture with two similar halves such that the gauging fixture may separate along the aperture thereby allowing the connector clip to be removed from the gauging fixture. The two halves of the gauging fixture are connected through the use of a threaded bolt which extends through a threaded aperture of the gauging fixture. When the connector clip is to be removed from the gauging fixture, the threaded bolt is manually threaded outward so as to separate the two halves of the gauging fixture. Un-threading the bolt to separate the two halves of the gauging fixture is a laborious task that requires a fair amount of time to complete. The time it takes to loosen the gauging fixture and remove the connector clips is multiplied by the number of connector clips that are attached to the sheet metal part. Considering that there may be fifteen to twenty connector clips on one sheet metal part, the time required to remove the connector clips is rather lengthy. The time associated with removing the connector clips from the gauge is undesirable and inefficient in an industrial environment.

It would be desirable to provide an apparatus for automatically and simultaneously removing a plurality of connector clips of a workpiece from a gauge.

SUMMARY OF THE INVENTION

The present invention provides an apparatus for automatically and simultaneously removing at least one connector clip of a workpiece from a gauging fixture of a gauge wherein the gauge determines the proper position of the connector clips relative to the workpiece. The present invention provides at least one gauging fixture having at least one aperture extending therethrough in a predetermined location. The aperture in the gauging fixture is adaptable to receive a connector clip on the workpiece wherein the connector clip is engageable with the aperture of the gauging fixture between a non-engaged position, wherein the connector clip is not engaged with the aperture of the gauging fixture, and an engaged position, wherein the connector clip engages the aperture in the gauging fixture for securing the workpiece to the gauge. At least one linear actuator is connected to the gauging fixture adjacent the aperture. The linear actuator may be actuated between a retracted position, wherein the connector clip remains engaged in the aperture of the gauging fixture, and an extended position, wherein the linear actuator disengages the connector clip from the gauging fixture.

BRIEF DESCRIPTION OF THE DRAWINGS

The description herein makes reference to the accompanying drawings wherein like referenced numerals refer to like parts throughout several views and wherein.

DESCRIPTION OF THE PREFERRED EMBODIMENT

Figure 1:
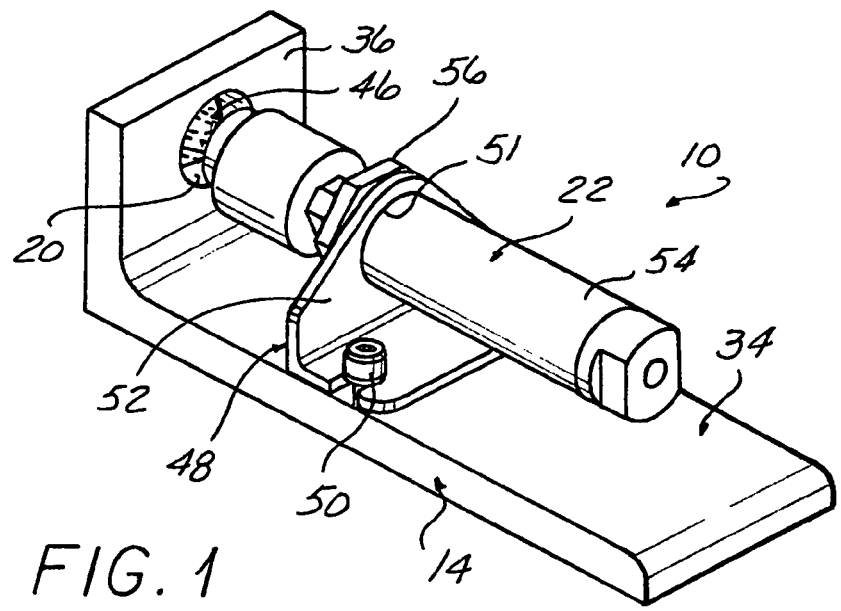
FIG. 1 is a perspective view of the apparatus of the present invention for automatically and simultaneously removing connector clips of a workpiece from a gauging fixture.
Figure 2:
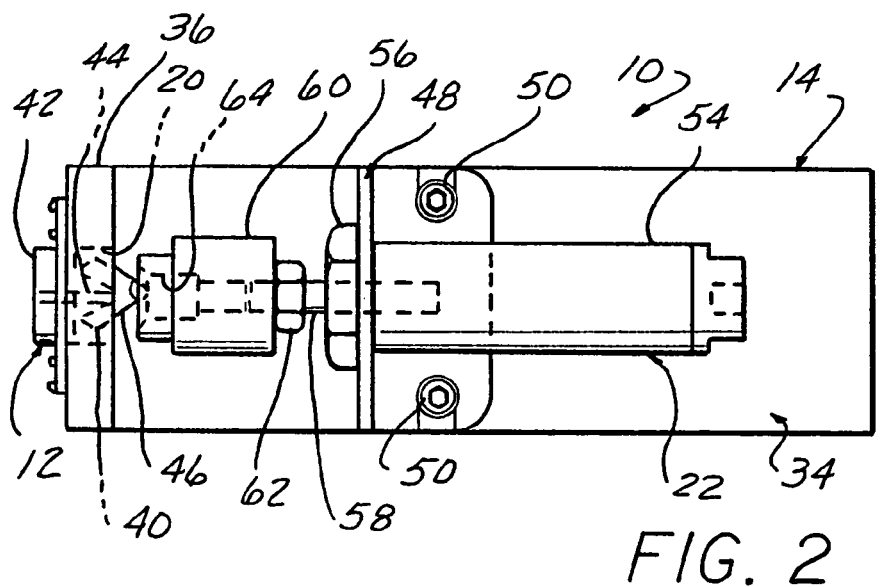
FIG. 2 is a top plan view of the apparatus of the present invention for automatically and simultaneously removing connector clips of a workpiece from a gauging fixture.
Figure 3:
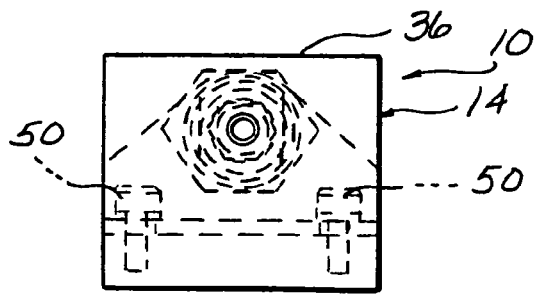
FIG. 3 is a side plan view of the apparatus of the present invention for automatically and simultaneously removing connector clips of a workpiece from a gauging fixture.
Figure 4:
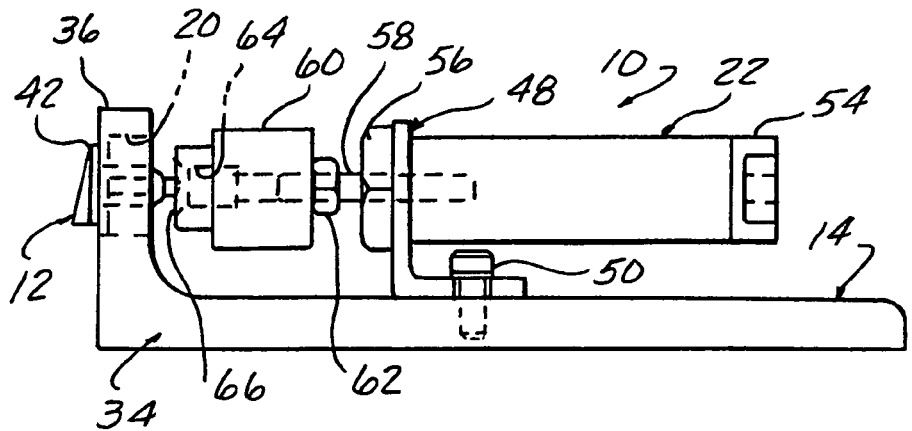
FIG. 4 is a front plan view of the apparatus of the present invention for automatically and simultaneously removing connector clips of a workpiece from a gauging fixture.

Referring to the drawings, the present invention will now be described in detail with reference to the disclosed embodiment.

FIGS. 1-6 illustrate an apparatus 10 of the present invention for automatically and simultaneously removing a plurality of connector clips 12 of a workpiece 18 from a gauge 16. The gauge 16 of the present invention provides a plurality of gauging fixtures 14 which receive the connector clips 12 of the workpiece 18 and determine whether the connector clips 12 are properly positioned on the workpiece 18. Each gauging fixture 14 corresponds to one connector clip 12 on the workpiece 18, and each gauging fixture 14 provides an aperture 20 for receiving a connector clip 12. A linear actuator 22 is connected to the gauging fixture 14 for engaging and removing the connector clip 12 from the gauging fixture 14. The apparatus 10 of the present invention may be commonly utilized in the automotive industry wherein the workpiece 18 may comprise a sheet metal part, such as an automobile body panel, having a plurality of the connector clips 12 attached thereto. The workpiece 18 may be attached to an automotive body or frame by inserting the connector clip 12 into corresponding apertures in the automotive body or frame. The gauge 16 determines the proper position of the connector clips 12 relative to the workpiece 18. Although the present invention is ideally suited for automobile body panels, the present invention is not limited to automobile body panels, but rather, the present invention may be utilized wherever connector clips 12 are being utilized and must be removed.

To support the gauging fixtures 14 and the workpiece 18, the gauge 16 provides a substantially rigid structure that supports the weight and size of the gauging fixtures 14 and the workpiece 18. The gauge 16 supports the gauging fixtures 14 in predetermined positions that correspond to the predetermined positions of the connector clips 12 provided on the workpiece 18. The connector clips 12 are typically connected to the back side of the workpiece 18 through conventional means such that the connector clips 12 may be received by a plurality of corresponding apertures provided on the frame or body of an automobile (not shown). Thus, the gauge 16 duplicates the pattern of apertures provided on the automobile body or frame so as to determine whether the connector clips 12 are properly positioned relative to the workpiece 18.

Figure 5:
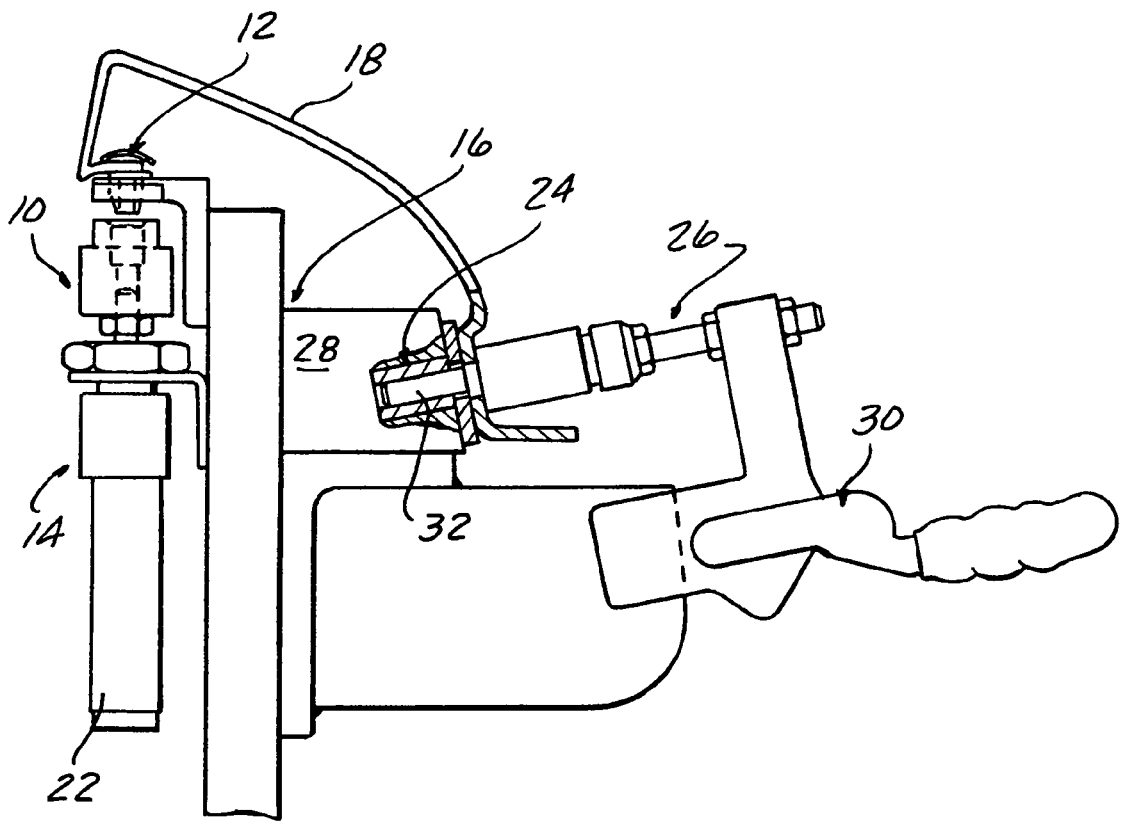
FIG. 5 is a sectional view showing the apparatus of the present invention being utilized to remove a connector clip of a workpiece from a gauging fixture.
Figure 6:
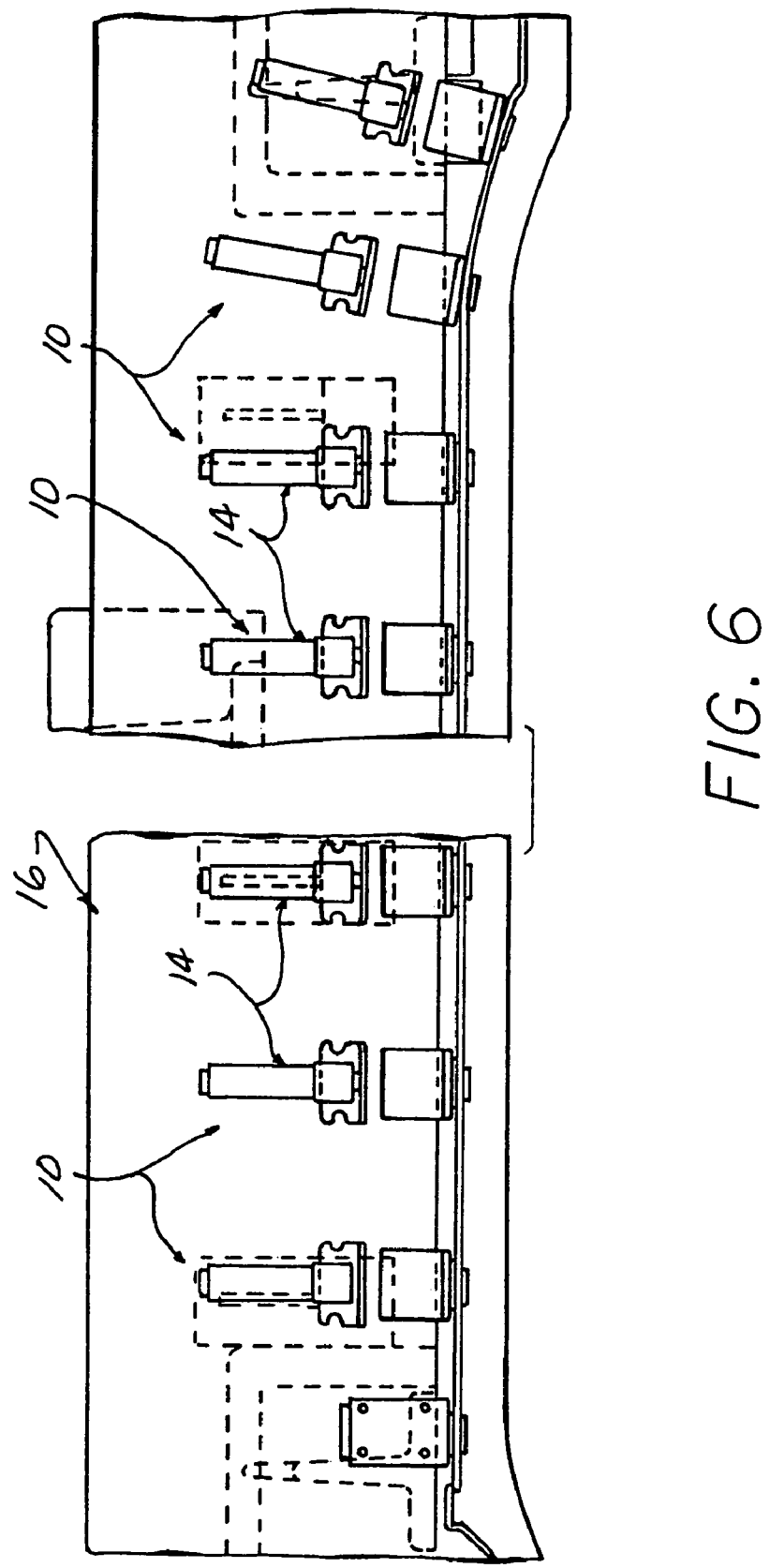
FIG. 6 is a top plan view showing a plurality of apparatuses of the present invention being utilized on a gauge.

Besides the gauge 16 having gauging fixtures 14 connected thereto, the gauge 16 may also include hole locators 24. As seen in FIG. 5, the hole locators 24 may include a manual clamping fixture 26 having a base 28 and a handle 30 pivotally connected thereto. The handle 30 has a locating pin 32 extending therefrom wherein the locating pin 32 is received by an aperture provided in the base 28 of the manual clamping fixture 26. The workpiece 18 has various locating holes therethrough which are used as datum points to gauge the proper position of the workpiece 18 relative to the gauge 16. Thus, the workpiece 18 extends over the base 28 of the manual clamping fixture 26, and the locating pin 32 is inserted through the locating hole of the workpiece 18 and into the aperture of the base 28 thereby securing the workpiece 18 to the gauge 16. The present invention is not limited to a manual clamping fixture 26 for securing the position of the workpiece 18 to the gauge 16, but rather, the present invention anticipates the use of a linear actuator 22, as will later be described in the subject specification, to activate the locating pin 32 into the locating hole of the workpiece 18 and into the base of the clamping fixture 26. The use of the linear actuator 22 will secure the workpiece 18 to the gauge 16 by automatically and simultaneously engaging all locating holes of the workpiece 18.

To check the position of the connector clips 12 relative to the workpiece 18, the gauging fixtures 14 are mounted at predetermined locations on the gauge 16 and correspond to the location of the apertures on the automobile body or frame. Each gauging fixture 14 includes an L-shaped bracket 34 that is connected to the gauge 16 through conventional means, such as welding. The L-shaped bracket 34 is substantially rigid and may be fabricated from various high-strength materials, such as steel. The short end 36 of the L-shaped bracket 34 extends out from the gauge 16 and provides an aperture 20 extending therethrough for receiving the connector clip 12.

The connector clips 12 are connected to the workpiece 18 through conventional means, and the connector clip 12 may include what is commonly referred to as a "W" clip 40. The "W" clip 40 has a substantially circular head 42 which may be connected to the workpiece 18 or may be prevented from extending through a small aperture provided in the workpiece 18. The "W" clip 40 also has a substantially cylindrical stem 44 that extends from the head 42 to a body 46. The body 46 of the "W" clip 40 has a substantially W-shaped planar configuration wherein the sides of the body 46 compress when inserted through the aperture 20 of the L-shaped bracket 34. Once the body 46 of the "W" clip 40 extends through the aperture 20 of the L-shaped bracket 34, the body 46 of the "W" clip 40 flexes outwardly to its normal, relaxed position thereby allowing the body 46 of the "W" clip 40 to extend beyond the boundaries of the aperture 20. Since the body 46 of the "W" clip 40 is larger in its relaxed position than the aperture 20, the body 46 of the "W" clip 40 is prevented from being pulled back through the aperture 20 of the L-shaped bracket 34 of the gauging fixture 14. Thus, the workpiece 18 is secured to the gauge 16.

To automatically remove the connector clip 12 from the gauging fixture 14, the gauging fixture 14 provides a mounting bracket 48 that is secured to the L-shaped bracket 34 through the use of two fasteners 50. The threaded fasteners 50 thread into corresponding threaded apertures provided in the L-shaped bracket 34. The mounting bracket 48 is substantially bent at a right angle such that it is substantially similar to the configuration of the L-shaped bracket 34. A threaded aperture 51 is provided in a portion 52 of the mounting bracket 48 extending away from the L-shaped bracket 34 for receiving the linear actuator 22. The linear actuator 22 provides an air cylinder 54 which is connected to a supply of pressurized air (not shown). The air cylinder 54 has a threaded body portion that threads into the threaded aperture 51 in the mounting bracket 48 and is secured to the mounting bracket 48 through the use of a jam nut 56. The jam nut 56 threads on to the threaded body portion of the air cylinder 54. The linear actuator 22 has a piston head (not shown) housed within the air cylinder 54, and a piston rod 58 that is connected to the piston head and extends outwardly from the air cylinder 54. A tooling head 60 is threaded onto the piston rod 58 and secured to the piston rod 58 through the use of a jam nut 62. The tooling head 60 includes a blind bore 64 for receiving the body 46 of the "W" clip 40. The blind bore 64 of the tooling head 60 has a chamfered edge 66 such that the body 46 of the "W" clip 40 is compressed when the tooling head 60 engages the body 46 of the "W" clip 40. When the linear actuator 22 is actuated, the piston rod 58 and the tooling head 60 may move between an engaged position, wherein the piston rod 58 and the tooling head 60 are withdrawn from the "W" clip 40 thereby allowing the body 46 of the "W" clip 40 to be captured by the aperture 38 in the gauging fixture 14, and a disengaged position, wherein the piston rod 58 and the tooling head 60 extend outwardly to engage the body 46 of the "W" clip 40 thereby compressing the body 46 of the "W" clip 40 and allowing the body 46 of the "W" clip 40 to be pushed back through the aperture 38 provided in the L-shaped bracket 34 of the gauging fixture 14.

In operation, the workpiece 18 is brought to the gauge 16 for confirmation as to the proper location of the connector clips 12 relative to the workpiece 18. The workpiece 18 is placed over the gauge 16, and the locating holes on the workpiece 18 are located on the manual clamping fixtures 26. The handles 30 on the manual clamping fixtures 26 are pivoted to move the locating pins 32 through the locating holes on the workpiece 18 and into the bases 28 of the manual clamping fixtures 26. Once the workpiece 18 is secured to the manual clamping fixtures 26, the connector clips 12 are inserted through the holes of the L-shaped brackets 34 of the gauging fixtures 14. When the connector clips 12 are inserted through the gauging fixtures 14, confirmation as to the location of the connector clips 12 is made. After gauging the workpiece 18, actuation of all of the linear actuators 22 is simultaneously made by a common switch (not shown). Pressurized air is supplied to the air cylinders 54, and the piston rods 58 drive the tooling heads 60 into engagement with the bodies 46 of the "W" clips 40. The tooling heads compress the bodies 46 of the "W" clips 40 and push the bodies 46 back through the aperture 38 provided in the L-shaped bracket 34. Thus, removal of all of the connector clips 12 from the gauging fixtures 14 occurs automatically and simultaneously thereby dramatically reducing the time associated with manually removing the connector clips 12 from the gauging fixture 14. The workpiece 18 is then removed from the gauge 16, and another workpiece 18 may be placed on the gauge 16.

While the invention has been described in connection with what is presently considered to be the most practical and preferred embodiment, it is to be understood that the invention is not to be limited to the disclosed embodiments, but to the contrary, it is intended to cover various modifications or equivalent arrangements included within the spirit and scope of the appended claims. The scope is to be accorded the broadest interpretation so as to encompass all such modifications and equivalent structures as is provided under the law.

What is claimed is:

1. An apparatus for automatically and simultaneously removing at least one connector clip of a workpiece from a gauge, comprising:
    at least one gauging fixture having at least one circular aperture extending therethrough in a predetermined position;
    said at least one aperture adaptable to receive said at least one connector clip of said workpiece between a disengaged position, wherein said at least one connector clip does not extend through said aperture and does not secure said workpiece against said gauging fixture, and an engaged position, wherein said at least one connector clip extends through said at least one aperture to secure said workpiece against said gauging fixture in order to gauge the position of said at least one connector clip relative to said workpiece;
    at least one linear actuator connected to said gauging fixture, and said linear actuator moving between a retracted position, wherein said linear actuator does not engage said at least one connector clip so said at least one connector clip remains in said engaged position, and an extended position, wherein said linear actuator engages and moves said at least one connector clip toward said disengaged position;
    said at least one linear actuator having a head extending therefrom, wherein said head provides an aperture that is engageable with said at least one connector clip in said extended position to compress and move said at least one connector clip toward said disengaged position; and
    a locating pin connectable to said gauge and moveable between a locating position, wherein said locating pin is adaptable to engage a locating hole in said workpiece and said gauge for properly positioning said workpiece relative to said gauge, and a non-locating position, wherein said locating pin is adaptable not to engage said locating hole in said workpiece and said gauge.

2. An apparatus for automatically and simultaneously removing at least one connector clip from a gauge, comprising:
    at least one gauging fixture having at least one circular aperture extending therethrough in a predetermined position;
    said at least one aperture adaptable to receive said at least one connector clip of said workpiece between a disengaged position, wherein said at least one connector clip does not extend through said aperture and does not secure said workpiece against said gauging fixture, and an engaged position, wherein said at least one connector clip extends through said aperture to secure said workpiece against said gauging fixture to gauge the position of said at least one connector clip relative to said workpiece;
    at least one linear actuator connected to said gauging fixture adjacent said aperture, and said at least one linear actuator having a head moveable between a retracted position, wherein said head is not engageable with said at least one connector clip, and an extended position, wherein said head is adapted to engage and move said at least one connector clip from said engaged position toward said disengaged position;
    said head having an aperture adaptable to receive said at least one connector clip in order to move said connector clip from said engaged position toward said disengaged position; and
    a locating pin connectable to said gauge and moveable between a locating position, wherein said locating pin is adaptable to engage a locating hole in said workpiece and said gauge for properly positioning said workpiece relative to said gauge, and a non-locating position, wherein said locating pin is adaptable not to engage said locating hole in said workpiece and said gauge.

3. An apparatus for automatically and simultaneously removing at least one connector clip of a workpiece from a gauge, comprising:
    at least one substantially L-shaped gauging fixture having at least one circular aperture having a longitudinal axis and extending therethrough in a predetermined position;
    said at least one aperture adaptable to receive said at least one connector clip of said workpiece between a disengaged position, wherein said at least one connector clip does not extend through said aperture and does not secure said workpiece against said gauging fixture, and an engaged position, wherein said at least one connector clip extends through said aperture to secure said workpiece against said gauging fixture to gauge the position of said at least one connector clip relative to said workpiece;
    at least one linear actuator connected to said gauging fixture adjacent said aperture, and said at least one linear actuator having a head with an aperture therein and chamfered edges leading into said aperture, wherein said aperture in said head has a longitudinal axis co-axial with said longitudinal axis of said aperture in said L-shaped gauging fixture;
    said head moveable between a retracted position, wherein said head is not engageable with said at least one connector clip in said engaged position, and an extended position, wherein said head is engageable with said at least one connector clip by having said aperture in said head receive said at least one connector clip and by having said chamfered edges compress said at least one connector clip to move said at least one connector clip from said engaged position toward said disengaged position; and a locating pin connectable to said gauge and moveable between a locating position, wherein said locating pin is adaptable to engage a locating hole in said workpiece and said gauge for properly positioning said workpiece relative to said gauge, and a non-locating position, wherein said locating pin is adaptable not to engage said workpiece and said gauge.

* * * * *